Patented Dec. 8, 1925.

1,564,955

UNITED STATES PATENT OFFICE.

ROBERT HALLER, OF GROSSENHAIN, GERMANY, ASSIGNOR TO CHEMISCHE FABRIK PYRGOS, OF RADEBEUL-DRESDEN, A CORPORATION OF GERMANY.

PROCESS FOR THE MANUFACTURE OF SOLUBLE-STARCH PRODUCTS.

No Drawing. Application filed February 24, 1925. Serial No. 11,345.

*To all whom it may concern:*

Be it known that I, ROBERT HALLER, a citizen of the Republic of Switzerland, residing at Grossenhain, Germany, have invented certain new and useful Improvements in Processes for the Manufacture of Soluble-Starch Products, of which the following is a specification.

Processes for the production of soluble starch by treating starch with oxidizing agents like perborates, permanganate, chlorinated lime or other hypochlorites, are already known. These processes have different disadvantages. The action of perborates for instance is hard to regulate and often tends to an explosive boiling up of the mixture. Permanganate and chlorinated lime cause the finished product to contain insoluble residues. Alkali-metal hypochlorites give rise to troubles by their alkaline reaction.

I have now found that starch can be turned into soluble starch, to particular advantage, by treating it with substances of the chloramine group.

Example.—1 kilogram of starch is heated with 10 grams of p-toluene-sodium-sulphochloramide and 10 litres of water, until a paste has been formed. Heating is then continued until the whole mass is liquefied and a clear viscous solution obtained, ready to be used as a dressing material. Its white colour gives it a better appearance than the yellowish product made by the use of perborates.

For purposes of transport, a simple mixture of p-toluene-sodium-sulphochloramide and starch will suit the purpose. By heating this powder with water, the required quantity of soluble starch can be made, whenever it is needed, for instance, for dressing.

Any sort of starch, for instance potato-starch or manioc-starch can be used in this process. The p-toluene-sulphochloramide can be replaced by other chloramides, for instance, benzene sulphochloramide, phthalyl-chloramide or -bromimide.

What I claim is:—

1. The process of rendering starch soluble, said process comprising acting upon starch with a chloramide.

2. The process of rendering starch soluble, said process comprising acting upon starch with a chloramide in the presence of water.

3. The process of rendering starch soluble, said process comprising acting upon starch with a chloramide in the presence of water at an elevated temperature.

4. The process of rendering starch soluble, said process comprising first mixing starch with a chloramide and then acting upon the mixture with water at an elevated temperature.

5. The process of rendering starch soluble, said process comprising acting upon starch with a salt of a chloramide.

6. The process of rendering starch soluble, said process comprising acting upon starch with a salt of a chloramide in the presence of water at an elevated temperature.

7. The process of rendering starch soluble, said process comprising first mixing starch with a salt of a chloramide and then acting upon the mixture with water at an elevated temperature.

8. The process of rendering starch soluble, said process comprising acting upon starch with p-toluenesulfochloramide.

9. The process of rendering starch soluble, said process comprising acting upon starch with p-toluenesulfochloramide in the presence of water at an elevated temperature.

10. The process of rendering starch soluble, said process comprising first mixing starch with p-toluenesulfochloramide and then acting upon the aforesaid mixture with water at an elevated temperature.

11. The process of rendering starch soluble, said process comprising acting upon starch with p-toluene-sodium-sulfochloramide.

12. The process of rendering starch soluble, said process comprising acting upon starch with p-toluene-sodium-sulfochloramide in the presence of water at an elevated temperature.

13. The process of rendering starch soluble, said process comprising first mixing starch with p-toluene-sodium-sulfochloramide and then acting upon the aforesaid mixture with water at an elevated temperature.

14. As a new article of manufacture, a mixture of starch with a chloramide, said mixture being capable of dissolving when acted upon with water at an elevated temperature.

15. As a new article of manufacture, a mixture of starch with a salt of a chloramide, said mixture being capable of dissolving when acted upon with water at an elevated temperature.

16. As a new article of manufacture, a mixture of starch with p-toluenesulfochloramide, said mixture being capable of dissolving when acted upon with water at an elevated temperature.

17. As a new article of manufacture, a mixture of starch with p-toluene-sodium-sulfochloramide, said mixture being capable of dissolving when acted upon with water at an elevated temperature.

In testimony whereof I affix my signature.

ROBERT HALLER.